United States Patent
Chorvath et al.

(10) Patent No.: US 7,345,118 B2
(45) Date of Patent: *Mar. 18, 2008

(54) FLUOROCARBON ELASTOMER SILICONE VULCANIZATES

(75) Inventors: Igor Chorvath, Midland, MI (US); Kermit Kwan, Midland, MI (US); David Romenesko, Midland, MI (US); Lauren Tonge, Sanford, MI (US); Stephen Warren, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 300 days.

This patent is subject to a terminal disclaimer.

(21) Appl. No.: 10/515,876

(22) PCT Filed: Jun. 6, 2003

(86) PCT No.: PCT/US03/17796

§ 371 (c)(1), (2), (4) Date: Nov. 24, 2004

(87) PCT Pub. No.: WO03/104322

PCT Pub. Date: Dec. 18, 2003

(65) Prior Publication Data

US 2007/0013101 A1    Jan. 18, 2007

Related U.S. Application Data

(60) Provisional application No. 60/387,015, filed on Jun. 6, 2002.

(51) Int. Cl.
 *C08F 289/00* (2006.01)
(52) U.S. Cl. .......................... 525/479; 528/24; 528/32; 528/38; 528/901
(58) Field of Classification Search ................ 525/479; 528/24, 32, 38, 901
See application file for complete search history.

(56) References Cited

U.S. PATENT DOCUMENTS

| | | | | |
|---|---|---|---|---|
| 4,263,414 A | * | 4/1981 | West | 525/102 |
| 4,942,202 A | | 7/1990 | Zama et al. | 525/104 |
| 4,946,883 A | | 8/1990 | Kunimatsu et al. | 524/265 |
| 4,985,483 A | | 1/1991 | Saito et al. | 524/265 |
| 5,010,137 A | | 4/1991 | Umeda et al. | 525/104 |
| 5,171,787 A | | 12/1992 | Zama et al. | 525/105 |
| 5,350,804 A | | 9/1994 | Takita et al. | 525/104 |
| 5,480,930 A | | 1/1996 | Gentle et al. | 524/414 |
| 5,483,000 A | | 1/1996 | Kaneko et al. | 525/102 |
| 5,540,972 A | * | 7/1996 | Jaegers et al. | 428/116 |
| 5,554,689 A | | 9/1996 | Langstein et al. | 525/102 |
| 6,015,858 A | * | 1/2000 | Gornowicz | 524/545 |
| 6,035,780 A | | 3/2000 | Badesha et al. | |
| 6,586,100 B1 | | 7/2003 | Pickering et al. | |
| 6,613,846 B2 | * | 9/2003 | Hintzer et al. | 525/326.2 |

FOREIGN PATENT DOCUMENTS

| | | |
|---|---|---|
| EP | 0 636 663 A2 | 7/1994 |
| EP | 0 544 265 B1 | 11/1995 |

OTHER PUBLICATIONS

Coran et al., Rubber Chemistry and Technology, vol. 53 (1980) 141-150.*

* cited by examiner

*Primary Examiner*—Kuo-Liang Peng
(74) *Attorney, Agent, or Firm*—Alan Zombeck

(57) ABSTRACT

A method is disclosed for preparing an elastomeric base composition comprising: (I) mixing by an extrusion process (A) a fluorocarbon elastomer with (B) an optional compatibilizer, (C) an optional catalyst (D) a silicone base comprising a curable organopolysiloxane, (E), an optional crosslinking agent (F) a cure agent in an amount sufficient to cure said organopolysiloxane; and (II) dynamically vulcanizing the organopolysiloxane, wherein the weight ratio of fluorocarbon elastomer (A) to silicone base (B) in the elastomeric base composition ranges from 95:5 to 30:70. The cured rubber compositions obtained from the elastomeric base compositions herein have good fuel resistance properties.

10 Claims, No Drawings

FLUOROCARBON ELASTOMER SILICONE VULCANIZATES

CROSS REFERENCES TO RELATED APPLICATIONS

The present application is a US national stage filing under 35 USC 371 and claims priority from PCT Application No. PCT/US03/17796 filed on Jun. 6, 2003, currently pending, which claims priority from U.S. Provisional Application No. 60/387015 filed on Jun. 6, 2002. The above-identified applications are incorporated by reference in their entirety.

The present invention relates to a method of making an elastomeric base composition comprising a fluorocarbon and silicone, the product prepared by the method, and the cured fluorocarbon rubber obtained therefrom. The cured rubber compositions have good fuel resistance properties despite the incorporation of silicone into the compositions.

Fluorocarbon elastomers, FKM, are an important class of industrial polymers due to their unique inherent properties. They are especially known to retain their elongation and tensile strength properties under extremely harsh chemical and thermal conditions. Fluorocarbon elastomers find use as sealing O-rings, molded goods, and extruded articles where the resulting fluorocarbon elastomer based articles are used in high temperature applications, and/or in applications where the article is exposed to harsh chemical environments. In particular, fluorocarbon elastomers are commonly used to make automotive components such as engine oil seals, fuel hoses, various O-rings, drive train seals, and other components that must maintain their properties while in contact with the operating conditions of combustion engines. However, the expense of fluorocarbon elastomers limits their use in many applications, while in other instances, current fluorocarbon elastomers lack certain physical property attributes, such as low temperature flex or modulus, and low durometer.

There have been relatively few successful attempts to provide modified fluorocarbon elastomers by the addition of, or combination with, other less expensive hydrocarbon or siloxane based polymers. Stable uniform mixtures are difficult to obtain due to the incompatibility of fluorocarbons with these polymers. Moreover, blends must be co-crosslinkable. Some examples to provide fluorocarbon and silicone elastomer compositions include U.S. Pat. Nos. 4,942,202, 4,985,483, 5,010,137, 5,171,787 and 5,350,804.

U.S. Pat. No. 4,942,202 teaches a rubber composition and vulcanized rubber products, which included fluorocarbons. The '202 compositions are prepared by reacting an organic peroxide, under shear deformation, with (I) a silicone rubber, (II) a saturated elastomer that fails to react with an organic peroxide when it is used alone, and (III) another elastomer that is co-crosslinkable with the silicone rubber in the presence of an organic peroxide. The other elastomer (III) is also co-crosslinkable or highly miscible with component (II).

U.S. Pat. No. 4,985,483 discloses fluororubber compositions containing dispersed particles of cured silicone material. The '483 compositions contain from 0.1 to 30 weight parts per 100 weight parts of a fluorocarbon of a finely divided cured silicone material in the form of a rubber, gel, or resin. The silicone material is first cured before mixing with the fluorocarbon. Preferably the silicone material used in the '483 patent is prepared using aqueous dispersion techniques described in U.S. Pat. No. 4,742,142, which provides silicone rubber particles having a size of less than 100 micrometers.

U.S. Pat. No. 5,010,137 teaches rubber compositions, which include fluorocarbons, and oil seals and rubber hoses obtained therefrom. The '137 compositions are obtained by compounding a polyorganohydrogensiloxane and a group VIII transition metal compound with a rubber-forming polymer comprising (I) a vinyl containing polyorganosiloxane and (II) an organic rubber, and subjecting the resulting compound to hydrosilylation while effecting shear deformation.

U.S. Pat. No. 5,171,787 teaches silicone-based composite rubber compositions, including fluorocarbons, and uses thereof. The '787 compositions are prepared by compounding a (A) rubber forming polymer comprising a polyorganosiloxane and an organic rubber, (B) a silicon compound having at least two hydrolyzable groups per molecule, and (C) a heavy metal compound, amine, or quaternary ammonium salt which catalyzes the hydrolysis and condensation reaction; and allowing the resulting formulation to undergo hydrolysis and condensation reactions while the formulation is kept from being deformed by shearing; and a crosslinking agent subsequently added followed by crosslinking of said organic rubber.

U.S. Pat. No. 5,350,804 teaches a composite rubber composition which comprises (a) an organic rubbery elastomer composition have a Mooney viscosity of at least 70 at 100° C. forming the matrix phase of the composite rubber composition; and (b) cured silicone rubber as a dispersed phase in the matrix phase.

While these patents provide advances in the field, a need still exists to specifically modify fluorocarbon elastomers in a manner to provide lower cost high performance elastomeric systems, while maintaining the inherent physical properties of fluorocarbons. In particular, there is a need to provide lower cost fluorocarbon elastomer compositions for use in various applications where high and or low temperature properties are required as well as resistance to fuels, oils, exhaust gases, or chemicals.

The present invention provides fluorocarbon elastomer compositions based on the incorporation of silicones with fluorocarbons using a dynamic vulcanization process. These fluorocarbon base elastomeric compositions result from the new mixing processes of the present invention. These new mixing processes provide compositions having significant quantities of a silicone rubber based composition incorporated into a fluorocarbon elastomer. However, the resulting cured fluorocarbon rubber composition prepared from the elastomeric base compositions of the present invention, maintain many of the desirable fluorocarbon physical property attributes, such as fuel impermeability.

Dynamic vulcanization techniques have been used to prepare thermoplastic elastomer compositions based on fluorocarbon resins, such as taught in U.S. Pat. No. 6,015,858. However, the '858 patent compositions are based on the use of a fluorocarbon resin having a glass transition temperature at room temperature or greater, and does not teach how to prepare fluorocarbon/silicone elastomer compositions that provide cured compositions having fuel permeability properties similar to the fluorocarbon based compositions alone.

This invention relates to a method for preparing an elastomeric base composition containing both a fluorocarbon elastomer and a silicone using an extrusion process. Thus, the present invention provides a method for preparing an elastomeric base composition comprising:
  (I) mixing by an extrusion process
    (A) a fluorocarbon elastomer with
    (B) an optional compatibilizer, (C) an optional catalyst
(D) a silicone base comprising a curable organopolysiloxane,
(E), an optional crosslinking agent
(F) a cure agent in an amount sufficient to cure said organopolysiloxane; and
(II) dynamically vulcanizing the organopolysiloxane.
wherein the weight ratio of fluorocarbon elastomer to silicone base in the elastomeric base composition ranges from 95:5 to 30:70.

The invention further relates to the elastomer base compositions obtained by the present method and cured fluorocarbon elastomeric compositions prepared therefrom.

Component (A) is any fluorocarbon elastomer having a glass transition temperature ($T_g$) below room temperature, alternatively below 23° C., alternatively, below 15° C., alternatively below 0° C. "Glass transition temperature", means the temperature at which a polymer changes from a glassy vitreous state to a plastic state. The glass transition temperature can be determined by conventional methods such as dynamic mechanical analysis (DMA) and Differential Scanning Calorimetry (DSC). Fluorocarbon elastomers are well known in the art and many are commercially available. Fluorocarbon elastomers are commonly denoted as FKM. Thus, the fluorocarbon elastomers, component (A), are abbreviated FKM herein. Representative, non-limiting examples of the FKM elastomers, and FKM polymers, useful as component (A) in the present invention can be found in summary articles of this class of materials such as in: "Encyclopedia of Chemical Technology", by Kirk-Othmer, $4^{th}$ Edition, Vol. 8, pages 990-1005, John Wiley & Sons, NY; "Polymeric Materials Encyclopedia", by J. C. Salamone, Vol. 4, pages 2495-2498, CRC Press, NY; "Encyclopedia of Polymer Science and Engineering, $2^{nd}$ Edition, Vol. 7, pages 257-269; and "Fluoroelastomers", by K.-L. Ring, A. Leder, and K Sakota, Chemical Economics Handbook-SRI International 2000, Elastomers-Specialty 525.6000A, all of which are hereby incorporated by reference.

Thus, the fluorocarbon elastomers maybe composed of combinations of the following fluorine-containing monomers: vinylidene fluoride, hexafluoropropene, pentafluoropropene, trifluoroethylene, trifluorochloroethylene, tetrafluoroethylene, vinyl fluoride, perfluoro(methylvinylether) and perfluoro(propylvinylidene). These monomers can also be copolymerized with copolymerizable monomers including vinyl compounds such as acrylate esters, olefin compounds such as propylene, and diene compounds. Examples of the fluorine rubbers produced in this way include vinylidene fluoride-hexafluoropropylene copolymer, vinylidene fluoride-hexafluoropropyelene-tetrafluoroethylene terpolymer, tetrafluoroethylene-propylene co-polymer, and tetrafluoroethylene-vinylidene fluoride-propylene terpolymer.

Alternatively, the fluorocarbon elastomer comprises a copolymer of vinylidene fluoride and hexafluoropropene, a terpolymer of vinylidene fluoride, hexafluoropropene, and tetrafluoroethene, or a terpolymer of vinylidene fluoride, tetrafluoroethene, and perfluoromethylvinyl ether.

Representative, non-limiting, commercially available materials useful as component (A) include the fluorocarbon elastomers sold under the tradenames of: VITON® by Dupont-Dow Elastomers, (Wilmington, Del.); Dyneon™ by Dyneon LLC (Oakdale, Minn.); Tecnoflon® by Solvay Solexis, Inc. (Bollate, Italy); Aflas™ by Asahi Glass Co. Ltd. (Ichihara, Chiba Prefecture); and Dai-el™ by Daikin Industries Ltd. (Settsu, Osaka Prefecture).

Compatibilizer (B) can be selected from any hydrocarbon, organosiloxane, fluorocarbon, or combinations thereof that would be expected to enhance the mixing of the silicone base (D) with the FKM elastomer (A). Generally, the compatibilizer can be one of two types. In a first embodiment, herein referred to as a physical compatibilizer, the compatibilizer is selected from any hydrocarbon, organosiloxane, fluorocarbon, or combinations thereof, that would not be expected to react with the FKM (A), yet still enhance the mixing of the FKM with the silicone base. In a second embodiment herein referred to as a chemical compatibilizer, the compatibilizer is selected from any hydrocarbon, organosiloxane, or fluorocarbon or combinations thereof that could react chemically with the FKM. However in either embodiment, the compatibilizer must not prevent the dynamic cure of the organopolysiloxane component, described infra.

In the physical compatibilizer embodiment, the compatibilizer (B) can be selected from any compatibilizer known in the art to enhance the mixing of a silicone base with a FKM elastomer. Typically, such compatibilizers are the reaction product of a organopolysiloxane and a fluorocarbon polymer. Representative non-limiting examples of such compatibilizers are described in U.S. Pat. Nos. 5,554,689 and 6,035,780, both of which are incorporated by reference herein. Alternatively, the compatibilizer can be selected from a fluorocarbon that can react with catalyst (C), or alternatively cure agent (F), during the mixing process.

In the chemical compatibilizer embodiment, typically the compatibilizer (B) can be selected from (B') organic (i.e., non-silicone) compounds which contain 2 or more olefin groups, (B") organopolysiloxanes containing at least 2 alkenyl groups,(B''') olefin-functional silanes which also contain at least one hydrolyzable group or at least one hydroxyl group attached to a silicon atom thereof, (B'''') an organopolysiloxane having at least one organofunctional groups selected from amine, amide, isocyanurate, phenol, acrylate, epoxy, and thiol groups, and any combinations of (B'), (B"), (B'''), and (B'''').

Organic compatibilizer (B') can be illustrated by compounds such as diallyphthalate, triallyl isocyanurate, 2,4,6-triallyloxy-1,3,5-triazine, triallyl trimesate, 1,5-hexadiene, 1,7-octadiene, 2,2'-diallylbisphenol A, N,N'-diallyl tartardiamide, diallylurea, diallyl succinate and divinyl sulfone, inter alia.

Compatibilizer (B") may be selected from linear, branched or cyclic organopolysiloxanes having at least 2 alkenyl groups in the molecule. Examples of such organopolysiloxanes include divinyltetramethyldisiloxane, cyclotrimethyltrivinyltrisiloxane, cyclo-tetramethyltetravinyltetrasiloxane, hydroxy end-blocked polymethylvinylsiloxane, hydroxy terminated polymethylvinylsiloxane-co-polydimethylsiloxane, dimethylvinylsiloxy terminated polydimethylsiloxane, tetrakis(dimethylvinylsiloxy)silane and tris(dimethylvinylsiloxy)phenylsilane. Alternatively, compatibilizer (B") is a hydroxy terminated polymethylvinylsiloxane [HO(MeViSiO)$_x$H] oligomer having a viscosity of about 25-100 m Pa-s, containing 25-35% vinyl groups and 2-4% silicon-bonded hydroxy groups.

Compatibilizer (B''') is a silane which contains at least one alkylene group, typically comprising vinylic unsaturation, as well as at least one silicon-bonded moiety selected from hydrolyzable groups or a hydroxyl group. Suitable hydrolyzable groups include alkoxy, aryloxy, acyloxy or amido groups. Examples of such silanes are vinyltriethoxysilane, vinyltrimethoxysilane, hexenyltriethoxysilane, hexenyltrimethoxy, methylvinyldisilanol, octenyltriethoxysilane, vinyltriacetoxysilane, vinyltris(2-ethoxyethoxy)silane, methylvinylbis(N-methylacetamido)silane, methylvinyldisilanol.

Compatibilizer (B"") is an organopolysiloxane having at least one organofunctional groups selected from amine, amide, isocyanurate, phenol, acrylate, epoxy, and thiol groups.

It is possible that a portion of the curable organopolysiloxane of the silicone base component (D) described infra, can also function as a compatibilizer. For example, a catalyst (C) can be used to first react a portion of the curable organopolysiloxane of silicone base (D) with the FKM elastomer to produce a modified FKM elastomer. The modified FKM elastomer is then further mixed with the remaining silicone base (D) containing the curable organopolysiloxane, and the organopolysiloxane is dynamically vulcanized as described infra.

The amount of compatibilizer used per 100 parts of FKM elastomer can be determined by routine experimentation. Typically, 0.05 to 10 parts by weight, or alternatively 0.05 to 15 parts by weight, or alternatively 0.1 to 5 parts of the compatibilizer is used for each 100 parts of FKM elastomer.

Optional component (C) is a catalyst. Typically, it is a radical initiator selected from any organic compound, which is known in the art to generate free radicals at elevated temperatures. The initiator is not specifically limited and may be any of the known azo or diazo compounds, such as 2,2'-azobisisobutyronitrile, but it is preferably selected from organic peroxides such as hydroperoxides, diacyl peroxides, ketone peroxides, peroxyesters, dialkyl peroxides, peroxydicarbonates, peroxyketals, peroxy acids, acyl alkylsulfonyl peroxides and alkyl monoperoxydicarbonates. A key requirement, however, is that the half life of the initiator be short enough so as to promote reaction of compatibilizer (B) with the FKM elastomer (A) within the time and temperature constraints of the reaction step (I). The modification temperature, in turn, depends upon the type of FKM elastomer and compatibilizer chosen and is typically as low as practical consistent with uniform mixing of components (A) through (C). Specific examples of suitable peroxides which may be used according to the method of the present invention include; 2,5-dimethyl-2,5-di(tert-butylperoxy)hexane, benzoyl peroxide, dicumyl peroxide, t-butyl peroxy O-toluate, cyclic peroxyketal, t-butyl hydroperoxide, t-butyl peroxypivalate, lauroyl peroxide and t-amyl peroxy 2-ethylhexanoate, di-t-butyl peroxide, 1,3-bis(t-butylperoxyisopropyl) benzene, 2,2,4-trimethylpentyl-2-hydroperoxide, 2,5-bis(t-butylperoxy)-2,5-dimethylhexyne-3, t-butyl-peroxy-3,5,5-trimethylhexanoate, cumene hydroperoxide, t-butyl peroxybenzoate and diisopropylbenzene mono hydroperoxide, inter alia. Less than 2 part by weight of peroxide per 100 parts of FKM elastomer is typically used. Alternatively, 0.05 to 1 parts, and 0.2 to 0.7 parts, can also be employed.

Component (D) is a silicone base comprising a curable organopolysiloxane (D') and optionally, a filler (D"). A curable organopolysiloxane is defined herein as any organopolysiloxane having at least two curable groups present in its molecule. Organopolysiloxanes are well known in the art and are often designated as comprising any number of M units ($R_3SiO_{0.5}$), D units ($R_2SiO$), T units ($RSiO_{1.5}$), or Q units ($SiO_2$) where R is independently any monovalent hydrocarbon group. Alternatively, organopolysiloxanes are often described as having the following general formula; $[R_mSi(O)_{4-m/2}]_n$, where R is independently any monovalent hydrocarbon group and m=1-3, and n is at least two.

The organopolysiloxane in the silicone base (D) must have at least two curable groups in its molecule. As used herein, a curable group is defined as any hydrocarbon group that is capable of reacting with itself or another hydrocarbon group, or alternatively with a crosslinker to crosslink the organopolysiloxane. This crosslinking results in a cured organopolysiloxane. Representative of the types of curable organopolysiloxanes that can be used in the silicone base are the organopolysiloxanes that are known in the art to produce silicone rubbers upon curing. Representative, non-limiting examples of such organopolysiloxanes are disclosed in "Encyclopedia of Chemical Technology", by Kirk-Othmer, 4$^{th}$ Edition, Vol. 22, pages 82-142, John Wiley & Sons, NY which is hereby incorporated by reference. Typically, organopolysiloxanes can be cured via a number of crosslinking mechanisms employing a variety of cure groups on the organopolysiloxane, cure agents, and optional crosslinking agent. While there are numerous crosslinking mechanisms, three of the more common crosslinking mechanisms used in the art to prepare silicone rubbers from curable organopolysiloxanes are free radical initiated crosslinking, hydrosilylation or addition cure, and condensation cure. Thus, the curable organopolysiloxane can be selected from, although not limited to, any organopolysiloxane capable of undergoing anyone of these aforementioned crosslinking mechanisms. The selection of components (D), (E), and (F) are made consistent with the choice of cure or crosslinking mechanisms. For example if hydrosilylation or addition cure is selected, then a silicone base comprising an organopolysiloxane with at least two vinyl groups (curable groups) would be used as component (D'), an organohydrido silicon compound would be used as component (E), and a platinum catalyst would be used as component (F). For condensation cure, a silicone base comprising an organopolysiloxane having at least 2 silicon bonded hydroxy groups (ie silanol, considered as the curable groups) would be selected as component (D) and a condensation cure catalyst known in the art, such as a tin catalyst, would be selected as component (F). For free radical initiated crosslinking, any organopolysiloxane can be selected as component (D), and a free radical initiator would be selected as component (F) if the combination will cure within the time and temperature constraints of the dynamic vulcanization step (II). Depending on the selection of component (F) in such free radical initiated crosslinking, any alkyl group, such as methyl, can be considered as the curable groups, since they would crosslink under such free radical initiated conditions.

The quantity of the silicone phase, as defined herein as the combination of components (D), (E) and (F), used can vary depending on the amount of FKM elastomer (A) used. However, it is typical to use levels of FKM elastomer (A) of 30 to 95 wt. %, alternatively, 50 to 90 wt. %, or alternatively 60 to 80 wt. % based on the total weight of components (A) through (F).

It is also convenient to report the weight ratio of fluorocarbon elastomer (A) to the silicone base (D) which typically ranges from 95:5 to 30:70, alternatively 90:10 to 40:60, alternatively 80:20 to 40:60.

In the addition cure embodiment of the present invention, the selection of components (D), (E), and (F) can be made to produce a silicon rubber during the vulcanization process via hydrosilylation cure techniques. This embodiment is herein referred to as the hydrosilylation cure embodiment. Thus, in the hydrosilylation cure embodiment, (D') is selected from a diorganopolysiloxane gum which contains at least 2 alkenyl groups having 2 to 20 carbon atoms in its molecule and optionally (D"), a reinforcing filler. The alkenyl group on the gum is specifically exemplified by vinyl, allyl, butenyl, pentenyl, hexenyl and decenyl, preferably vinyl or hexenyl. The position of the alkenyl functionality is not critical and it may be bonded at the molecular chain terminals, in non-terminal positions on the molecular chain or at both positions. Typically, the alkenyl group is vinyl or hexenyl and that this group is present at a level of 0.0001 to 3 mole percent, alternatively 0.0005 to 1 mole percent, in the diorganopolysiloxane. The remaining (i.e., non-alkenyl) silicon-bonded organic groups of the diorganopolysiloxane are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenylethyl; and halogenated alkyl groups having 1 to 20 carbon atoms, such as 3,3,3-trifluoropropyl and chloromethyl. It will be understood, or course, that these groups are selected such that the diorganopolysiloxane has a glass temperature (or melt point) which is below room temperature and the cured polymer is therefore elastomeric. Typically, the non-alkenyl silicon-bonded organic groups in the diorganopolysiloxane makes up at least 85, or alternatively at least 90 mole percent, of the organic groups in the diorganopolysiloxanes.

Thus, polydiorganosiloxane (D') can be a homopolymer, a copolymer or a terpolymer containing such organic groups. Examples include copolymers comprising dimethylsiloxy units and phenylmethylsiloxy units, copolymers comprising dimethylsiloxy units and 3,3,3-trifluoropropylmethylsiloxy units, copolymers of dimethylsiloxy units and diphenylsiloxy units and interpolymers of dimethylsiloxy units, diphenylsiloxy units and phenylmethylsiloxy units, among others. The molecular structure is also not critical and is exemplified by straight-chain and partially branched straight-chain structures, the linear systems being the most typical.

Specific illustrations of diorganopolysiloxane (D') include: trimethylsiloxy-endblocked dimethylsiloxane-methylvinylsiloxane copolymers; trimethylsiloxy-endblocked methylphenylsiloxanedimethylsiloxane-methylvinylsiloxane copolymers; trimethylsiloxy-endblocked 3,3,3-trifluoropropylmethyl siloxane copolymers; trimethylsiloxy-endblocked 3,3,3-trifluoropropylmethyl-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and similar copolymers wherein at least one end group is dimethylhydroxysiloxy. Typical systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 85-95%.

The gum may also consist of combinations of two or more organopolysiloxanes. Alternatively, diorganopolysiloxane (D') is a linear polydimethylsiloxane homopolymer and is preferably terminated with a vinyl group at each end of its molecule or it is such a homopolymer, which also contains at least one vinyl group along its main chain.

For the purposes of the present invention, the molecular weight of the diorganopolysiloxane gum is sufficient to impart a Williams plasticity number of at least about 30 as determined by the American Society for Testing and Materials (ASTM) test method D 926. Although there is no absolute upper limit on the plasticity of component (D'), practical considerations of processability in conventional mixing equipment generally restrict this value. Typically, the plasticity number should be 40 to 200, or alternatively 50 to 150.

Methods for preparing high consistency unsaturated group-containing diorganopolysiloxanes are well known and they do not require a detailed discussion in this specification.

Optional component (D") is any filler which is known to reinforce diorganopolysiloxane (D') and is preferably selected from finely divided, heat stable minerals such as fumed and precipitated forms of silica, silica aerogels and titanium dioxide having a specific surface area of at least about 50 $m^2$/gram. The fumed form of silica is a typical reinforcing filler based on its high surface area, which can be up to 450 $m^2$/gram. Alternatively, a fumed silica having a surface area of 50 to 400 $m^2$/g, or alternatively 90 to 380 $m^2$/g, can be used. The filler is added at a level of about 5 to about 150 parts by weight, alternatively 10 to 100 or alternatively 15 to 70 parts by weight, for each 100 parts by weight of diorganopolysiloxane (D').

The filler is typically treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes.

Component (D) may also contain other materials commonly used in silicone rubber formulations including, but not limited to, antioxidants, crosslinking auxiliaries, processing agents, pigments, and other additives known in the art, which do not interfere with step (II) described infra.

In the hydrosilylation cure embodiment of the present invention, compound (E) is added and is an organohydrido silicon compound (E'), that crosslinks with the diorganopolysiloxane (D'). The organohydrido silicon compound is an organopolysiloxane which contains at least 2 silicon-bonded hydrogen atoms in each molecule which are reacted with the alkenyl functionality of (D') during the dynamic curing step (II) of the present method. A further (molecular weight) limitation is that Component (E') must have at least about 0.2 weigh percent hydrogen, alternatively 0.2 to 2 or alternatively 0.5 to 1.7, percent hydrogen bonded to silicon. Those skilled in the art will, of course, appreciate that either the diorganopolysiloxane (D') or component (E'), or both, must have a functionality greater than 2 to cure the diorganopolysiloxane (i.e., the sum of these functionalities must be greater than 4 on average). The position of the silicon-bonded hydrogen in component (E') is not critical, and it may be bonded at the molecular chain terminals, in non-terial positions along the molecular chain or at both positions. The silicon-bonded organic groups of component (E') are independently selected from any of the saturated hydrocarbon or halogenated hydrocarbon groups described above in connection with diorganopolysiloxane (D'), including preferred embodiments thereof. The molecular structure of component (E') is also not critical and is exemplified by straight-chain, partially branched straight-chain, branched, cyclic and network structures, linear polymers or copolymers being typical. It will, of course, be recognized that this component must be compatible with D' (i.e., it is effective in curing the diorganopolysiloxane).

Component (E') is exemplified by the following: low molecular weight siloxanes such as $PhSi(OSiMe_2H)_3$; trimethylsiloxy-endblocked methylhydridopolysiloxanes; trimethylsiloxy-endblocked dimethylsiloxane-methylhydridosiloxane copolymers; dimethylhydridosiloxy-endblocked dimethylpolysiloxanes; dimethylhydrogensiloxy-endblocked methylhydrogenpolysiloxanes; dimethylhydridosiloxy-endblocked dimethylsiloxane-methylhydridosiloxane copolymers; cyclic methylhydrogenpolysiloxanes; cyclic dimethylsiloxane-methylhydridosiloxane copolymers; tetrakis(dimethylhydrogensiloxy)silane; silicone resins composed of $(CH_3)_2HSiO_{1/2}$, $(CH_3)_3SiO_{1/2}$, and $SiO_{4/2}$ units; and silicone resins composed of $(CH_3)_2HSiO_{1/2}$, $(CH_3)_3SiO_{1/2}$, $CH_3SiO_{3/2}$, $PhSiO_{3/2}$ and $SiO_{4/2}$ units, wherein Ph hereinafter denotes phenyl radical.

Typical organohydrido silicon compounds are polymers or copolymers comprising RHSiO units terminated with either $R_3SiO_{1/2}$ or $HR_2SiO_{1/2}$ units wherein R is independently selected from alkyl radicals having 1 to 20 carbon atoms, phenyl or trifluoropropyl, typically methyl. Also, typically the viscosity of component (E') is about 0.5 to 1,000 mPa-s at 25° C., alternatively 2 to 500 mPa-s. Component (E') typically has 0.5 to 1.7 weight percent hydrogen bonded to silicon. Alternatively, component (E') is selected from a polymer consisting essentially of methylhydridosiloxane units or a copolymer consisting essentially of dimethylsiloxane units and methylhydridosiloxane units, having 0.5 to 1.7 weight percent hydrogen bonded to silicon and having a viscosity of 2 to 500 mPa-s at 25° C. Such a typical system has terminal groups selected from trimethylsiloxy or dimethylhydridosiloxy groups. Component (E') may also be a combination of two or more of the above described systems.

The organohydrido silicon compound (E') is used at a level sufficient to cure diorganopolysiloxane (D') in the presence of component (F), described infra. Typically, its content is adjusted such that the molar ratio of SiH therein to Si-alkenyl in (D') is greater than 1. Typically, this SiH/alkenyl ratio is below about 50, alternatively 1 to 20 or alternatively 1 to 12. These SiH-functional materials are well known in the art and many are commercially available.

In the hydrosilylation cure embodiment of the present invention, component (F) is a hydrosilation catalyst (F'), that accelerates the cure of the diorganopolysiloxane. It is exemplified by platinum catalysts, such as platinum black, platinum supported on silica, platinum supported on carbon, chloroplatinic acid, alcohol solutions of chloroplatinic acid, platinum/olefin complexes, platinum/alkenylsiloxane complexes, platinum/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (F') is typically a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex of platinous chloride and divinyltetramethyldisiloxane, prepared according to U.S. Pat. No. 5,175,325 to Brown et al., these patents being hereby incorporated by reference. Alternatively, catalyst (F) is a neutralized complex of platinous chloride and divinyltetramethyldisiloxane.

Component (F') is added to the present composition in a catalytic quantity sufficient to promote the reaction between organopolysiloxane (D') and component (E') so as to cure the organopolysiloxane within the time and temperature limitations of the dynamic vulcanization step (II). Typically, the hydrosilylation catalyst is added so as to provide about 0.1 to 500 parts per million (ppm) of metal atoms based on the total weight of the elastomeric base composition, alternatively 0.25 to 50 ppm.

In another embodiment, components (D), (E), and (F) are selected to provide a condensation cure of the organopolysiloxane. For condensation cure, an organopolysiloxane having at least 2 silicon bonded hydroxy groups (i.e. silanol, considered as the curable groups) would be selected as component (D), a organohydrido silicon compound would be selected as the optional crosslinking agent (E), and a condensation cure catalyst known in the art, such as a tin catalyst, would be selected as component (F). The organopolysiloxanes useful as condensation curable organopolysiloxanes is any organopolysiloxane which contains at least 2 silicon bonded hydroxy groups (or silanol groups) in its molecule. Typically, any of the organopolysiloxanes described infra as component (D) in the addition cure embodiment, can be used as the organopolysiloxane in the condensation cure embodiment, although the alkenyl group would not be necessary in the condensation cure embodiment. The organohydrido silicon compound useful as the optional crosslinking agent (E) is the same as described infra for component (E). The condensation catalyst useful as the curing agent in this embodiment is any compound which will promote the condensation reaction between the SiOH groups of diorganopolysiloxane (D) and the SiH groups of organohydrido silicon compound (E) so as to cure the former by the formation of —Si—O—Si— bonds. Examples of suitable catalysts include metal carboxylates, such as dibutyltin diacetate, dibutyltin dilaurate, tin tripropyl acetate, stannous octoate, stannous oxalate, stannous naphthanate; amines, such as triethyl amine, ethylenetriamine; and quaternary ammonium compounds, such as benzyltrimethylammoniumhydroxide, beta-hydroxyethyltrimethylammonium-2-ethylhexoate and beta-hydroxyethylbenzyltrimethyldimethylammoniumbutoxide (see, e.g., U.S. Pat. No. 3,024,210).

In yet another embodiment, components (D), (E), and (F) can be selected to provide a free radical cure of the organopolysiloxane. In this embodiment, the organopolysiloxane can be any organopolysiloxane but typically, the organopolysiloxane has at least 2 alkenyl groups. Thus, any of the organopolysiloxane described supra as suitable choices for (D') in the addition cure embodiment can also be used in the free radical embodiment of the present invention. A crosslinking agent (E) is not required in the free radical cure embodiment. The cure agent (F) can be selected from any of the free radical initiators described supra for the selection of component (B).

In addition to the above-mentioned major components (A) through (F), a minor amount (i.e., less than 50 weight percent of the total composition) of one or more optional additive (G) can be incorporated in the elastomeric base compositions of the present invention. These optional additives can be illustrated by the following non-limiting examples: extending fillers such as quartz, calcium carbonate, and diatomaceous earth; pigments such as iron oxide and titanium oxide; fillers such as carbon black and finely divided metals; heat stabilizers such as hydrated cerric oxide, calcium hydroxide, magnesium oxide; and flame retardants such as halogenated hydrocarbons, alumina trihydrate, magnesium hydroxide, wollastonite, organophosphorous compounds and other fire retardant (FR) materials, handling additives, and other additives known in the art. These additives are typically added to the final fluorocarbon base elastomeric composition after dynamic cure, but they may also be added at any point in the preparation provided they do not interfere with the dynamic vulcanization mechanism. These additives can be the same, or different, as the additional components added to prepare the cured elastomeric compositions, described infra.

Mixing for step (I) can be performed in any extrusion device that is capable of uniformly and quickly dispersing the components (B) through (G) with (A) the FKM elastomer. Typically the mixing by an extrusion process is conducted on a twin-screw extruder. The order of mixing components (A) through (E) is not critical. Typically (G) would be added after (F) but it is not critical as long as (G) does not interfere with cure of the organopolysiloxane (e.g., (G) can be premixed with the FKM elastomer and/or with (D) the silicone base).

In a typical mixing procedure, the FKM elastomer (A) and compatibilizer (B) are first mixed in an extruder at a controlled temperature and then when used, catalyst (C) is added. The silicone base (D) is added next and when used, optional crosslinking agent (E) is added and finally, a cure agent (F). The temperature used during this elastomer (chemical) modification step is experimentally determined so as to impart an optimum half life for the initiator (C). During this step, component (C) must be thoroughly mixed into the FKM elastomer/compatibilizer combination as it concurrently decomposes to a sufficient extent to graft the compatibilizer to the FKM elastomer (A) in the time allotted. If the temperature is too high, the initiator decomposes prematurely and modification of the elastomer is inefficient; if the temperature is too low, not enough initiator decomposes and little modification of the FKM elastomer results. It is also preferred that FKM (A) and silicone base (D) are thoroughly mixed prior to the addition of the curing agent (F). Typically, the extrusion mixing process is conducted at a temperature range of 100 to 350° C., alternatively, 125 to 300° C., and yet alternatively 150 to 250° C.

In one preferred embodiment of the present inventive method, the mixing is conducted on a twin-screw extruder in a time period of less than 3 minutes, or alternatively less than 2 minutes.

The second step (II) of the method of the present invention is dynamically vulcanizing the organopolysiloxane. The dynamic vulcanizing step cures the organopolysiloxane. Step (II) can occur simultaneous with the mixing step (I), or alternatively following the mixing step (I). Typically, step (II) occurs simultaneous with the mixing step (I), and is effected by the same temperature ranges and mixing procedures described for step (I).

The present invention also relates to the elastomeric compositions prepared according to the methods taught herein, and further to the cured elastomeric compositions prepared therefrom. The inventors believe the techniques of the present invention provide unique and useful elastomeric compositions, as demonstrated by the inherent physical properties of the fluorocarbon base elastomeric compositions, vs compositions of similar combinations of fluorocarbon elastomers and silicone bases prepared by other methods or techniques. Furthermore, the cured fluorocarbon elastomer compositions, as described infra, prepared from the fluorocarbon base elastomeric compositions of the present invention also possess unique and useful properties. For example, cured fluorocarbon elastomers prepared from the fluorocarbon base elastomeric compositions of the present invention have surprisingly good hydrocarbon fuel swell properties and low permeation. Many silicones, especially dimethylpolysiloxane-based rubbers, are known to swell in volume when contacted with hydrocarbon fuels. Thus, when silicones are combined with fluorocarbons, the resulting cured elastomeric compositions often have diminished fuel swell properties when compared to the fluorocarbon alone. Although not wishing to be bound be any theory, the inventors believe the methods of this invention provide compositions wherein the vulcanized silicone phase (prepared from the in-situ dynamic vulcanization) is thoroughly dispersed within the fluorocarbon. In other words, the fluorocarbon can be considered the continuous phase of the mixture and the silicone as the internal phase. As a result, when the cured compositions are contacted with a hydrocarbon fuel, the continuous fluorocarbon phase minimizes direct contact of the hydrocarbon fuel with the silicone phase. Subsequently, fuel swell properties, or fuel permeabilities are not substantially reduced for the cured FKM elastomeric compositions prepared according to the techniques of this invention, as compared to the fuel swell properties of cured fluorocarbon elastomeric compositions containing comparable levels of silicones (especially silicone rubber), but prepared by other techniques such as simple mixing of a silicone rubber with a fluorocarbon elastomer. Furthermore, additional physical property benefits are expected in other uses and applications of the present compositions where it would be advantageous to prevent contact of the silicone phase in the fluorocarbon mixture with an external medium that would otherwise adversely affect the silicone phase.

The cured FKM elastomeric compositions of the present invention can be prepared by curing the FKM elastomer component of the fluorocarbon base elastomeric composition of the present invention via known curing techniques. Curing of FKM elastomers, and additional components added prior to curing, are well known in the art. Any of these known techniques, and additives, can be used to cure the fluorocarbon base elastomeric compositions of the present invention and prepare cured fluorocarbon elastomers therefrom. Representative examples of such curing techniques, and typical additives are disclosed in "Encyclopedia of Chemical Technology", by Kirk-Othmer, $4^{th}$ Edition, Vol. 8, pages 990-1005, John Wiley & Sons, NY, which is hereby incorporated by reference. Further, representative, non-limiting, examples of the cure techniques, and typical additives, that can be used are described in the technical information publications offered by major FKM elastomer suppliers, such as for example, Fluoroelastomers; Compounding Fluoroelastomers, and Fluoroelastomers Curing Fluoroelastomers by Dyneon, as shown at www.dyneon.com (May, 2002). Typically, FKM elastomers are cured by one of three crosslinking mechanisms utilizing cure agents selected from diamine compounds, bis phenol-onium compounds, or peroxides. (Cure agents that are added for the purpose of curing the FKM elastomer, are referred herein as FKM cure agents, to distinguish these cure agents from the cure agents added to cure the silicone base component of the present invention.) The cure process of FKM elastomers also typically involves two steps. The first step often involves the application of heat and pressure in a mold to shape the article, followed optionally by a high temperature post cure step to produce the finished cured product.

Additional components can be added to the fluorocarbon base elastomeric compositions prior to curing the FKM elastomer component. These additional components can be any component or ingredient typically added to a FKM elastomer or FKM elastomer gum for the purpose of preparing a cured FKM elastomer composition. Typically, these components can be selected from acid acceptors, fillers, processing aids, and curatives. Many commercially available FKM elastomers can already comprise these additional components. FKM elastomers having these additional components can be used as component (A), described supra, providing they do not prevent the dynamically vulcanization of the silicone base in step II of the method of this invention. Alternatively, such additional components can be added to the fluorocarbon base elastomeric composition prior to the final curing of the FKM elastomer.

Non limiting examples of the acid acceptors useful to prepare cured FKM elastomers from the inventive fluorocarbon base elastomeric compositions include; calcium hydroxide, magnesium oxide, lead oxide (Litharge), $PbHPO_3$ (Dyphos), calcium oxide, and zinc oxide.

Curatives are any component added to the base FKM elastomer composition that enhances the cure of the FKM elastomer. Thus, curatives can comprise FKM curing agents cure-promoters, and acid acceptors (described supra). For example, the base FKM elastomer may be cross linked by incorporating FKM cure agents or combinations of FKM cure agents such as a bisphenol and a organic onium salt accelerator, for example bisphenol A or bisphenol AF with triphenylbenzylphosphonium chloride or diphenylbenzyl (diethylamine)phosphonium chloride; a polyfunctional organic amine or derivative of the amines such as a carbamate, for example hexamethylenediamine carbamate; and organic peroxides and cure promoters which act with the free radicals generated from decomposition of the peroxide to provide a more useful cure.

The cured FKM elastomer composition may also comprise a filler. Examples of fillers include carbon black; coal dust fines; silica; metal oxides, e.g., iron oxide and zinc oxide; zinc sulfide; calcium carbonate; and barium sulfate and others known in the art.

The cured fluorocarbon elastomers described herein are expected to have similar fuel swell and/or chemical resistance properties as conventional FKM elastomers, but with improved low temperature performance and processing characteristics. The cured elastomers of the present invention can be used in a similar manner as conventional or known high performance elastomers, including FKM and silicone elastomers. They can be used to construct various articles illustrated by but not limited to O-rings, gaskets, seals, liners, hoses, tubing, diaphragms, boots, valves, belts, blankets, coatings, rollers, molded goods, extruded sheet, caulks, and extruded articles, for use in applications areas which include but not are limited to transportation including automotive, watercraft, and aircraft; chemical and petroleum plants; electrical; wire and cable; food processing equipment; nuclear power plants; aerospace; medical applications; and the oil and gas drilling industry and other applications which typically use high performance elastomers such as ECO, FKM, HNBR, acrylic rubbers and silicone elastomers.

EXAMPLES

The following examples are presented to further illustrate the compositions and method of this invention, but are not construed as limiting the invention, which is delineated in the appended claims. All parts and percentages in the examples are on a weight basis and all measurements were obtained at approximately 23° C., unless otherwise indicated.

Materials

BASE 1 is a silicone rubber base made from 54% PDMS 1, defined infra, 36% of a fumed silica having a surface area of about 250 m$^2$/g, 11% of a hydroxy-terminated diorganopolysiloxane having an average degree of polymerization (DP) of about 8.

BASE 2 is a silicone rubber base made from 57% PDMS 1, defined infra, 33% of a fumed silica having a surface area of about 250 m$^2$/g, 6.5% hexamethyldisilazane and 3.3% water.

CATALYST 1 is 2,5-dimethyl-2,5-di(tert-butylperoxy)hexane (CAS#78-63-7) marketed by Akzo Nobel Chemicals, Inc. as TRIGONOX 101

CATALYST 2 is 2,5-dimethyl-2,5-di(tert-butylperoxy)hexyne (CAS#1068-27-5), 85% in mineral oil marketed by Akzo Nobel Chemicals, Inc. as TRIGONOX 145-E85

COMPATIBILIZER 1 is an hydroxy end-blocked methylvinylsiloxane oligomer having a viscosity of about 35 mPa-s and containing 30% —CH═CH$_2$ groups and 3% OH groups.

COMPATIBILIZER 2 is Triallyl-1,3,5-triazine-2,4,6-(1H,3H,5H)-trione (CAS#1025-15-6) also known as triallyl isocyanurate and marketed by Aldrich Chemical Company, Inc.

VC-20 is a masterbatch made from 67% of a copolymer of vinylidene fluoride and hexafluoropropene (CAS# 9011-17-0) and 33% benzyltriphenylphosphonium chloride (CAS# 1100-88-5) and marketed by Dupont Dow Elastomers, LLC as Viton™ Curative VC-20.

VC-30 is a masterbatch made from a copolymer of vinylidene fluoride and hexafluoroprope (CAS# 9011-17-0), a terpolymer of vinylidene fluoride, hexafluoropropene, and tetrafluoroethene (CAS# 25190-89-0), Bisphenol AF (CAS# 1478-61-1), and 4,4'-dichlorodiphenyl sulfone (CAS# 80-07-9) and marketed by Dupont Dow Elastomers, LLC as Viton™ Curative VC-30.

CRI-ACT-45 is a 45% active dispersion of a 2/1 ratio of Ca(OH)2 and Magnesium Oxide on fluoroelastomer supplied by Cri-Tech, a division of IMMIX Technologies, LLC.

B-600 is made from a terpolymer of vinylidene fluoride, hexafluoropropene, and tetrafluoroethene (CAS# 25190-89-0) and marketed by Dupont Dow Elastomers, LLC as Viton™ B-600.

B-202 is made from a terpolymer of vinylidene fluoride, hexafluoropropene, and tetrafluoroethene (CAS# 25190-89-0) and marketed by Dupont Dow Elastomers, LLC as Viton™ B-202.

FC 2211 is a co-polymer of vinylidene fluoride and hexafluoropropene marketed by Dyneon, LLC as Dyneon™ Fluoroelastomer FC 2211.

PDMS 1 is a gum consisting of 99.81 wt % Me$_2$SiO units, 0.16% MeViSiO units and 0.03% Me$_2$ViSiO$_{1/2}$ units having a Williams plasticity of 60.

Testing

The tensile, elongation, and 100% modulus properties of the cured elastomeric base compositions were measured by a procedure is based on ASTM D 412. Shore A Durometer was measured by a procedure is based on ASTM D 2240. Fuel swell was done in Reference Fuel C at 40° C. for 48 hour; the method complies with ASTM D 471. Compression set (C/S) was evaluated at 25% by a method based on ASTM D 395, Method B.

Permeation was evaluated by a modified ASTM E96 method using Payne cups. Reference Fuel C was mixed with 10 volume percent ethanol to make CE10 test fuel. The test fuel is placed in the cup, a rubber diaphragm was the placed on top of the cup then secured with a sealing rig held down with setscrews. The cup was inverted for direct fuel contact on the diaphragm. Weight loss measurements were taken until the permeation rate was constant. Permeation rates were calculated per ASTM E96 using the surface area of the diaphragm and reported in mm·grams/m²·day units.

Examples 1-6

Various fluorocarbon base elastomeric compositions were prepared using a 25 mm Werner and Pfleiderer twin-screw extruder with the processing section heated to 180° C. and a screw speed of 300 rpm at an output rate of 7.5 kg/hr. The process began with the addition of a fluorocarbon elastomer (B-600) to the extruder at a feed rate of 87.2 grams/minute, followed by the other formulation components, in the order as listed (beginning at the top, and where X designates the use of the component in the run, added at the rates described below) in Table 2. The compatibilizer and catalyst, when used, were fed through a pumping system channeled through barrel injection ports that fed directly into the extruder. COMPATIBILIZER 1 (when used) was fed at a rate of 2.1 grams/minute. The first addition of CATALYST 1 (when used) was added at a rate of 0.52 grams/minute. The silicone base (BASE 1) was added at such a rate to provide a formulation where the volume ratio of fluorocarbon/silicone was 60/40. The second addition of CATALYST 1 (when used) was added at a rate of 1.10 grams/minute.

The resulting fluorocarbon base elastomeric compositions obtained from the extruder were compounded until on a mill until uniform with 3 parts of VC-20, 3.8 parts of VC-30, and 20 parts of Cri-Act-45 to give 6 parts of calcium hydroxide and 3 parts of magnesium oxide per 100 parts of FKM (A). The samples were press cured for 10 minutes at 177° C., and then post-cured for 24 hours at 232° C. The formulations and resulting properties are summarized in Table 1. Ease of processing is a measure of how the elastomeric compositions milled during compounding. The samples were rated on a 10 point scale whereas 1 is the most favored processing. 1 is a smooth material up to 10 where the material is powdery and does not come together on the mill. The physical properties results of sample 3 and 4 reflect their poor processibility and thus slab quality.

TABLE 1

|  | Example # | | | | | |
|---|---|---|---|---|---|---|
|  | 1 | 2 | 3 | 4 | 5 | 6 |
| Formulation | | | | | | |
| B-600 | X | X | X | X | X | X |
| Compatibilizer 1 | X | X | | | X | |
| Catalyst 1 | X | | X | | X | |
| Base 1 | X | X | X | X | X | X |
| Catalyst 1 | X | X | X | X | | |
| Properties | | | | | | |
| Permeation, mm · gm/day · m² | 1767 | 1405 | 1876 | 1377 | 6045 | 6264 |
| Shore A Durometer | 65 | 68 | 63 | 60 | 59 | 64 |
| Tensile strength, MPa | 5.6 | 5.5 | 4.2 | 2.4 | 4.1 | 3.5 |
| Elongation, % | 238 | 206 | 229 | 163 | 304 | 331 |
| 100% Modulus, MPa | 3.1 | 1.6 | 1.6 | 1.6 | 1.3 | 3.1 |
| C/S 70 hr/200° C., % | 60 | 55 | 52 | 51 | 60 | 71 |
| Ease of Processing | 4 | 3 | 9 | 10 | 1 | 1 |
| Slab Bubbled on press cure* | No | No | No | No | Yes | Yes |

*if yes, the slab bubbled as a result of improper cure

Examples 7-10

Various fluorocarbon base elastomeric compositions were prepared using a 25 mm Werner and Pfleiderer twin-screw extruder with the processing section heated to 180° C. and a screw speed of 375 rpm at an output rate of 7.6 kg/hr. The process began with the addition of a fluorocarbon elastomer (B-600) to the extruder at a feed rate of 86.2 grams/minute, followed by the other formulation components, in the order as listed in Table 2. The compatibilizer and catalyst were fed through a pumping system channeled through barrel injection ports that fed directly into the extruder. COMPATIBILIZER 1 (when used alone) was fed at a rate of 2.09 grams/minute. The silicone base (BASE 2) was added at such a rate to provide a formulation where the volume ratio of fluorocarbon/silicone was 60/40. The addition of CATALYST 1 or 2 (when used alone) was added at a rate of 1.13 grams/minute. In Example 10, COMPATIBILIZER 1 and CATALYST 1 were mixer prior to injection into the extruder. The blend was fed at 3.22 grams/minute.

The resulting Fluorocarbon base elastomeric compositions obtained from the extruder were compounded until on a mill until uniform with 3 parts of VC-20, 3.8 parts of VC-30, and 20 parts of Cri-Act-45 to give 6 parts of calcium hydroxide and 3 parts of magnesium oxide per 100 parts of FKM (A). The samples were press cured for 10 minutes at 177° C., and then post-cured for 24 hours at 232° C. The formulations and resulting properties are summarized in Table 2.

TABLE 2

|  | Example # | | | |
|---|---|---|---|---|
|  | 7 | 8 | 9 | 10 |
| Order of Addition | B-600 | B-600 | B-600 | B-600 |
| | Compat. 1 | Compat. 1 | Base 1 | Base 1 |
| | Base 1 | Base 1 | Compat. 1 | Compat. 1/ |
| | Catalyst 2 | Catalyst 1 | Catalyst 1 | Catalyst 1 |

TABLE 2-continued

|  | Example # | | | |
|---|---|---|---|---|
|  | 7 | 8 | 9 | 10 |
| Properties | | | | |
| Permeation mm · gm/day · m² | 2296 | 2711 | 3549 | 3352 |
| Shore A Durometer | 71 | 70 | 71 | 65 |
| Tensile strength, MPa | 6.6 | 6.7 | 5.7 | 5.6 |
| Elongation, % | 153 | 159 | 187 | 221 |

Examples 11-15

Various Fluorocarbon base elastomeric compositions were prepared using a 25 mm Werner and Pfleiderer twin-screw extruder with a screw speed of 300 rpm. The processing section temperature and output rate are indicated in Table 3. The process began with the addition of a fluorocarbon elastomer to the extruder, followed by the other formulation components, in the order as listed in Table 3. The compatibilizer and catalyst were fed through a pumping system channeled through barrel injection ports that fed directly into the extruder. The silicone base was added at such a rate to provide a formulation where the volume ratio of fluorocarbon/silicone were as indicated in Table 3.

The resulting Fluorocarbon base elastomeric compositions obtained from the extruder based on B-600 and B202 were compounded until on a mill until uniform with 3 parts of VC-20, 3.8 parts of VC-30, and Cri-Act-45 to give 6 parts of calcium hydroxide and 3 parts of magnesium oxide per 100 parts of FKM (A). The FC 2211 was compounded in a similar manner with 1.5 parts of VC-20, 5 parts of VC-30, and Cri-Act-45 to give 6 parts of calcium hydroxide and 3 parts of magnesium oxide per 100 parts of FKM (A). The samples were press cured for 10 minutes at 177° C., and then post-cured for 24 hours at 232° C. The formulations and resulting properties are summarized in Table 3. All feed rates are listed in grams/minute.

TABLE 3

|  | Example # | | | | |
|---|---|---|---|---|---|
|  | 11 | 12 | 13 | 14 | 15 |
| Output Rate kg/hr | 20 | 20 | 20 | 20 | 7.6 |
| Section Temperature, ° C. | 150 | 150 | 150 | 150 | 180 |
| FKM | FC 2211 | B-202 | B-202 | B-202 | B-600 |
| FKM Feed Rate | 223.9 | 225.4 | 195.6 | 193.8 | 85.2 |
| Compatibilizer | Compat. 1 | Compat. 1 | Compat. 1 | Compat. 1 | Compat. 2 |
| Compat. Feed Rate | 5.42 | 5.45 | 4.73 | 7.75 | 2.56 |
| 1st Catalyst Feed Rate | 1.34 | 1.35 | 1.17 | 1.16 | 0.00 |
| Silicone Base | Base 1 | Base 1 | Base 1 | Base 1 | Base 2 |
| FKM/Silicone volume ratio | 60/40 | 60/40 | 50/50 | 50/50 | 60/40 |
| 2nd Catalyst Feed Rate | 3.02 | 2.98 | 3.87 | 3.84 | 1.51 |
| Extrudate Temperature, ° C. | 210 | 235 | 250 | 250 |  |
| Properties | | | | | |
| Permeation mm · gm/day · m² | 2559 | 1692 | 2578 | 2329 | 2072 |
| Tensile strength, MPa | 5.7 | 4.3 | 6.0 | 6.2 | 6.1 |
| Elongation, % | 148 | 114 | 135 | 139 | 188 |

The invention claimed is:

1. A method for preparing an elastomeric base composition having a fluorocarbon continuous phase comprising:

(I) mixing by an extrusion process
  (A) a fluorocarbon elastomer having a glass transition temperature below 23° C. with
  (B) a compatibilizer selected from;
    (B') organic compounds which contain 2 or more olefin groups,
    (B") organopolysiloxanes containing at least 2 alkenyl groups,
    (B''') olefin-functional silanes which also contain at least one hydrolyzable group or at least one hydroxyl group attached to a silicon atom thereof,
    (B'''') an organopolysiloxane having at least one organofunctional groups selected from amine, amide, isocyanurate, phenol, acrylate, epoxy, and thiol groups,
    and any combinations of (B'), (B"), (B'''), and (B''''),
  (C) an organic peroxide catalyst,
  (D) a silicone base comprising
    (D') a diorganopolysiloxane gum containing at least 2 silicone bonded hydroxy groups,
    (D") a filler,
  (E) an optional crosslinking agent,
  (F) a cure agent in an amount sufficient to cure said organopolysiloxane, and
(II) dynamically vulcanizing the organopolysiloxane, wherein the weight ratio of fluorocarbon elastomer to silicone base in the elastomeric base composition ranges from 95:5 to 30:70.

2. The method of claim 1 wherein step (I) and step (II) occurs in less than 2 minutes.

3. The method of claim 1 wherein the extrusion process is conducted on a twin-screw extruder.

4. The method of claim 1 wherein the fluorocarbon elastomer (A) comprises a polymer, copolymer, or terpolymer prepared from at least one monomer having a carbon-bonded reactive group selected from hydrogen, chlorine, bromine or iodine, and one monomer having a carbon-bonded fluorine.

5. The method of claim 1 wherein the fluorocarbon elastomer (A) comprises a copolymer or terpolymer of:

vinylidene fluoride and hexafluoropropene;

vinylidene fluoride, hexafluoropropene and tetrafluoroethene;

vinylidene fluoride, tetrafluoroethene, and perfluoromethylvinyl ether.

6. The method of claim 1 wherein (B) the compatibilizer is selected from hydroxy terminated polymethylvinylsiloxanes.

7. The method of claim 1 wherein (B) the compatibilizer is triallyl isocyanurate.

8. The method of claim 1 wherein the organic peroxide is selected from hydroperoxides, diacyl peroxides, ketone peroxides, peroxyesters, dialkyl peroxides, peroxydicarbonates, peroxyketals, peroxy acids, acyl alkylsulfonyl peroxides and alkyl monoperoxydicarbonates.

9. The method of claim 1 wherein the cure agent (F) is a condensation cure catalyst.

10. The method of claim 1 wherein the cure agent (F) is a free radical initiator.

* * * * *